(No Model.)
F. L. SELLERS & J. G. SCHISSEL.
GATE.
No. 475,708. Patented May 24, 1892.
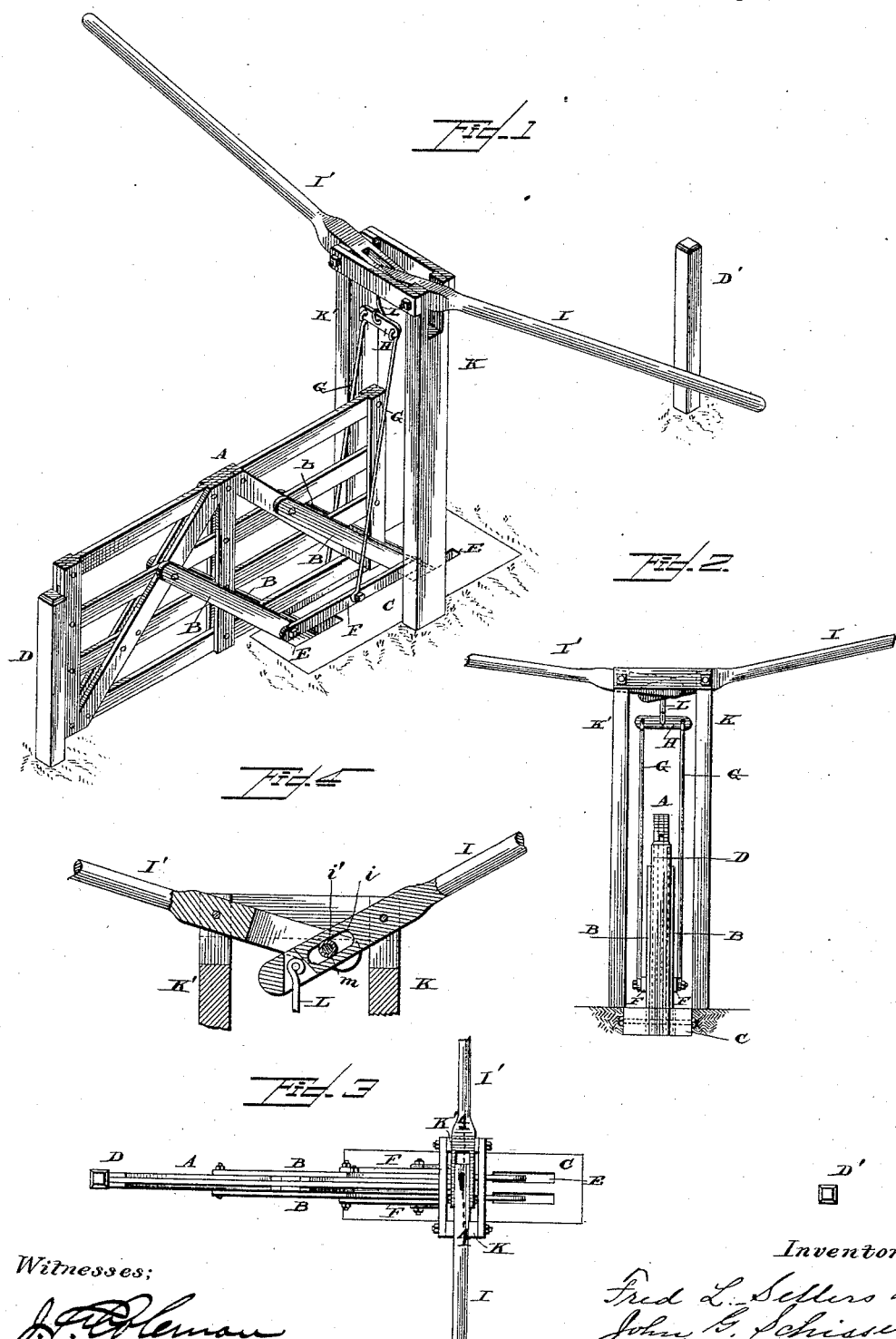

UNITED STATES PATENT OFFICE.

FREDERICK L. SELLERS AND JOHN G. SCHISSEL, OF QUIMBY, IOWA.

GATE.

SPECIFICATION forming part of Letters Patent No. 475,708, dated May 24, 1892.

Application filed February 17, 1892. Serial No. 421,815. (No model.)

*To all whom it may concern:*

Be it known that we, FREDERICK L. SELLERS and JOHN G. SCHISSEL, citizens of the United States, residing at Quimby, in the county of Cherokee and State of Iowa, have invented certain new and useful Improvements in Gates; and we do hereby declare the following to be a full, clear, and exact description of the invention, such as will enable others skilled in the art to which it appertains to make and use the same.

Our invention has for its object to produce an improved gate of that class known as "jump-gates"—that is, gates which are pivotally connected with arms or levers upon which they are supported and swung as they are moved in the direction of their length from one extreme position to another, the arms causing such gates to rise as they approach their medium position from either direction.

The invention consists of the improvements to be hereinafter pointed out, and which are illustrated in the drawings, wherein—

Figure 1 is a perspective view of a gate embodying our invention. Fig. 2 is an end view. Fig. 3 is a plan view. Fig. 4 is a section through the gate-operating levers, taken on the line 4 4 of Fig. 3.

In the drawings, A represents the gate, which may be of any usual or approved construction. B B are arms pivoted at their lower ends to a sill-piece C or other suitable support and at their upper ends to the gate. The two arms B are parallel and so arranged that when the gate is in its closed position they incline in one direction and when open in the opposite direction the gate may be stopped at the end of its movement by abutting against the posts D and D' or by reason of the arms coming in contact with stops E. The arms B are connected, preferably, near their lower ends by a cross-bar F, to which the gate shifting or operating devices are connected. There are by preference two of the arms B on each side of the gate and a cross-bar F uniting each pair of arms.

G G are links connecting the cross-bars F with a cross-piece H, arranged above the gate, and this cross-piece is connected with the gate-operating levers I and I'. These levers extend away from the gate by the side of the roadway and are pivoted in posts K and K'. One of the levers I is united by a link L or other suitable device with the cross-piece H, and is slotted at *i* between its inner end and its fulcrum. The inner end of the other lever I' lies by the side of the inner end of the lever I, to which it is connected by a pin *i'*, carried by the lever I' and passing through the slot *i*. We prefer to bifurcate the inner end of the lever and to arrange the end of the lever I between the bifurcated portions thereof, as shown in the drawings, and also to surround the pin *i'* by a roller *m*, which runs in contact with the walls of the slot and reduces friction. Whether the gate is in its closed or open position, its weight, with that of the connected parts, draws downward the inner end of the levers I and I', at the same time elevating their outer ends, so that whether it be wished to open or to close the gate it is only necessary to pull downward upon the outer end of one of these levers.

By connecting the gate-operating devices with the cross-bar which unites the pivotal supporting-arms we insure that the force which is expended in moving the gate shall be communicated evenly to both arms, and by separating the arms so that the pivots which unite them with the gate are about equally distant from each other and from the ends of the gate there is no tendency for the gate to rock on one pivot or for a greater amount of wear to be upon one pivot than on the other, as would be the case were the links G attached to one of the arms B.

The construction of the operating-levers and their connections with the cross-bars F is simple and effective, reducing the number of parts to a minimum, and yet so disposing them that whichever of the levers be used the force will be directly and economically applied.

What we claim, and desire to secure by Letters Patent, is—

1. The combination, with a gate, of the swinging supporting-arms B B, pivotally connected to the gate, a connecting-bar between these arms, and the gate-operating devices connected with the said connecting-bar, substantially as set forth.

2. The combination, with a gate, of the swinging supporting-arms B B, pivotally connected with the gate near their upper ends, the connecting-bars F, uniting the arms B, the links G, connected with the bars F, the cross-piece H above the gate, connecting the upper ends of the links, and the gate-operating levers connected with the bar H, substantially as set forth.

In testimony whereof we have affixed our signatures in presence of two witnesses.

FRED. L. SELLERS.
JOHN G. SCHISSEL.

Witnesses:
S. L. BODDY,
DANIEL H. BLOOM.